United States Patent
Vetter et al.

(10) Patent No.: US 6,287,470 B1
(45) Date of Patent: Sep. 11, 2001

(54) TWO-STEP METHOD FOR DEHYDRATING PLASTIC DISPERSIONS

(75) Inventors: Heinz Vetter, Rossdorf; Hartmut Schikowsky, Darmstadt; Werner Hoess, Heusenstamm, all of (DE)

(73) Assignee: Roehm GmbH, Darmstadt (DE)

( * ) Notice: Subject to any disclaimer, the term of this patent is extended or adjusted under 35 U.S.C. 154(b) by 0 days.

(21) Appl. No.: 09/403,770

(22) PCT Filed: Apr. 7, 1998

(86) PCT No.: PCT/EP98/02005
§ 371 Date: Dec. 13, 1999
§ 102(e) Date: Dec. 13, 1999

(87) PCT Pub. No.: WO98/50212
PCT Pub. Date: Nov. 12, 1998

(30) Foreign Application Priority Data

May 2, 1997 (DE) ............................................. 197 18 597

(51) Int. Cl.$^7$ .................................................. B01D 19/00

(52) U.S. Cl. .......................... 210/718; 210/737; 210/738; 264/102; 264/211.23; 366/85

(58) Field of Search .................................. 210/702, 738, 210/768, 770, 780, 781, 718, 737; 264/102, 211.23; 366/85; 528/502 R, 502 A, 502 C

(56) References Cited

U.S. PATENT DOCUMENTS

| | | | | |
|---|---|---|---|---|
| 4,148,991 | * | 4/1979 | Skidmore | 528/502 |
| 4,446,094 | * | 5/1984 | Rossiter | 264/349 |
| 4,802,769 | * | 2/1989 | Tanaka | 366/75 |
| 4,921,909 | * | 5/1990 | Sugimori et al. | 525/64 |
| 5,041,249 | * | 8/1991 | Yeh | 264/85 |
| 5,232,649 | * | 8/1993 | Anderson et al. | 264/211.23 |
| 5,457,156 | * | 10/1995 | Liu et al. | 525/74 |
| 5,650,107 | * | 7/1997 | Vetter et al. | 264/102 |
| 5,958,316 | * | 9/1999 | Guntherberg et al. | 264/101 |
| 5,962,614 | * | 10/1999 | Burroway et al. | 526/340 |

FOREIGN PATENT DOCUMENTS

0423759A2 * 4/1991 (EP) .
0683028A1 * 5/1995 (EP) .

\* cited by examiner

Primary Examiner—Peter A. Hruskoci
(74) Attorney, Agent, or Firm—Oblon, Spivak, McClelland, Maier & Neustadt, P.C.

(57) ABSTRACT

The invention relates to a method for dehydrating a two-phase liquid mixture consisting of a thermoplastic synthetic melt phase and an aqueous phase, comprising the following steps: a) coagulation of the two-phase liquid mixture in a first extruder; b) dehydration of the coagulate in a twin screw extruder with a de-watering zone and screws working in an opposite direction; c) separation of constituents by degasifying. The inventive method is characterized in that a single screw extruder or a twin screw extruder with screws working in the same direction is used as a first extruder in step a).

4 Claims, No Drawings

TWO-STEP METHOD FOR DEHYDRATING PLASTIC DISPERSIONS

This invention relates to an improved process for dewatering resin melts containing water.

STATE OF THE ART

EP-A 0 534 235 describes a process for preparing high-impact strength modified thermoplastics. A resin latex is first coagulated by adding a coagulant (calcium formate solution) at 90° C. The precoagulate with a solids content of about 60 wt. % is then dewatered mechanically in an extruder. One of the advantages of the process lies in the removal of a portion of the water contained in the rubber. This achieves a higher throughput of rubber with simultaneously reduced energy consumption.

EP-A 0 006 503 describes the preparation of a coagulate from a graft polymer of a polybutyl acrylate latex by precipitation by adding a calcium chloride solution at 95° C.

U.S. Pat. No. 4,602,083 describes a process for the coagulation of polymers containing water by adding water-soluble non-oxidizing salts such as calcium hypophosphite or zinc methanesulfonate, for example.

When adding precipitants, there is generally the problem that the quality of the resin may be impaired since the auxiliary can cause unwanted side reactions, such as yellowing, for example. EP-A 0 683 028 describes a process for dewatering a two-phase fluid mixture of a thermoplastic resin melt and a water phase in a counter-rotating twin-screw extruder. The coagulation of the resin latex in this case occurs under the shear action in the coagulation zone at a temperature in the thermoplastic range of the resin. Alternatively, a precoagulate can also be used. The melt is then transported in partially filled screw grooves and is blocked into a cohesive melt cake in at least one of these screw grooves with the formation of a locally narrowly limited steep pressure gradient. In this way, the water flows downward in front of the boundary of the melt cake under the action of gravity, so that the melt cake is not in contact with a cohesive water phase. Using this process, the water content of an emulsion polymer with an initial water content of 55 wt. % can be reduced to only 8 wt. % water. The residual volatile fractions can then be largely separated in a degassing extruder through a forward and backward degassing zone. The granulate taken off at the granulation nozzle finally has a residual moisture content of only 0.06 wt. %.

EP-A 0 423 759 describes a process for preparing a particulate polymer in which a polymer latex is mixed with a coagulant. An organic solvent in which the polymer is insoluble, for example n-heptane, is then added to the mixture, whereby granular polymer particles are formed in the polymer slurry. The process is characterized by the fact that at least one of the mixing steps has to occur in a double-screw extruder with co-rotating screws.

PROBLEM AND SOLUTION

EP-A 0 683 028 makes possible very good dewatering of two-phase fluid mixtures of a thermoplastic resin melt and an aqueous phase. For example, water contents of only about 8 wt. % can be reached before transfer to the degassing extruder step. However, it has been found that the temperatures needed for coagulation in the coagulation zone of the extruder and the resultant extremely high temperatures on the outer cylinder wall of up to 350° C. can cause extreme materials stress. The energy has to be introduced by heat conduction through the cylinder wall. The heat flow density, of course, is limited by finite material strength, that must not be exceeded by thermal stresses. The thermal stresses occur because of the temperature gradient from the outer cylinder wall to the inner cylinder wall necessary for the heat transfer. This is all the more problematical when the cylinder has to be made of corrosion-proof steel to prevent corrosion, since high-alloy corrosion-resistant materials usually have poor heat conductivity. Because of the poor thermal conductivity, the limited material strength, and the finite heat exchange area, there are therefore limits on coagulability and thus on total product throughput. Especially, however, the problem exists that system wear is very high in counter-rotating twin-screw extruders. This causes a short service life of the cylinder and of the built-in extruder screws.

Therefore, the problem was seen to be to develop an improved process for dewatering two-phase fluid mixtures of a thermoplastic resin phase and an aqueous phase, with which extreme material stress on the coagulation extruder is avoided to the greatest possible extent. On the other hand, the total throughput of the resin melt to be dewatered should be as high as possible. The dewatering capacity should also be at least equal to or greater than in the process of EP-A 683 028. The process should also lead to the smallest possible residual polymer contents of the wastewater, since these are undesirable. At the same time, process steps such as adding precipitants for latex coagulation should also be avoided.

The problem has been solved by a process for dewatering a two-phase fluid mixture of a thermoplastic resin phase and a water phase by a) coagulating the two-phase fluid mixture in a first extruder b) dewatering the coagulate in a twin-screw extruder with counter-rotating screws with a dewatering zone c) separating volatile constituents by degassing characterized by the fact that a single-screw extruder or a twin-screw extruder is used in step a) as the first extruder, with the twin-screw extruder being equipped with co-rotating screws.

It was found, surprisingly, that the separation of process steps a) and b), which are performed in one step in EP-A 0 683 028, leads to an especially effective process when a coagulate is first produced in step a) in a single-screw extruder or in a twin-screw extruder with co-rotating screws, before performing the actual dewatering and degassing in steps b) and c). Producing the coagulate then occurs very effectively since the energy input necessary for coagulation can occur essentially by dissipation (shear). Since the coagulation is already effective in step a), in turn a lower and more readily controllable and thus more exact temperature setting is possible in step b). Coagulation in the extruder in process step a) is preferably performed at a melt temperature at least 30° C. higher than the subsequent dewatering in process step b), and it is especially preferred to be performed with a higher screw speed. This leads to lower material stress, particularly in the cylinder of the dewatering extruder, and at the same time makes possible better control and more stable operation of the dewatering step b). Overall, more effective dewatering of the two-phase mixture of the thermoplastic resin melt and the water phase is therefore achieved than in the process according to the state of the art. In this way, at least 94% of the aqueous phase can be separated in liquid form at the end of process step b).

FIELD OF USE OF THE INVENTION

The process pursuant to the invention is generally suitable for dewatering two-phase fluid mixtures of the thermoplastic resin phase and a water phase. For example they can be emulsion polymers for polymethyl methacrylate molding compositions (e.g., see EP-A 245 647) or latices, for example such as high-impact strength modifiers.

Corresponding listings of such two-phase mixtures that can be dewatered can be found, for example, in EP-A 0 534 235 or in EP-A 0 006 503.

Latices usually contain 30 to 50 wt. % dispersed resin particles whose average particle sizes, for example, can be from 100 to 500 nm. The water phase accordingly amounts to 70 to 50 wt. %; it generally contains dissolved emulsifiers or other auxiliaries and extraneous substances. The latex particles consist of thermoplastic resins that can be processed in an extruder in the molten form. Among them are thermoplastic resins with glass transition temperatures of 20 to 150° C. and a temperature range in the molten condition in which they are sufficiently resistant to decomposition. The melt temperature during processing in an extruder is usually between 50 and 250° C.

Important classes of thermoplastic resins are copolymers based on styrene, butadiene, and optionally acrylonitrile, as well as polyvinyl chloride, polyacrylates, and polymethacrylates. Another important class consists of latices of multiphased thermoplastic resins containing latex particles with a thermoplastic hard phase and a crosslinked tough phase. They can optionally be blended during the process with another thermoplastic resin that is introduced in process step c), for example, in the solid or molten form, and that is the same as or is compatible with the hard phase of the latex. The resin of the hard phase preferably consists predominantly of polymethyl methacrylate, and the resin of the tough phase preferably consists predominantly of crosslinked polybutyl acrylate, which can also be copolymerized with styrene or benzyl acrylate to match its optical refractive index to that of the polymethyl methacrylate.

Typical blends of this type, for example, contain 4 to 50 wt. % of the multiphased latex resin, of which the polybutyl acrylate fraction can amount to 20 to 98 wt. %, as well as 2 to 80 wt. % of the thermoplastic polymethyl methacrylate resin. When the latter is to be introduced in the non-molten form, it is also possible to blend the latex of the multiphased resin with a polymethyl methacrylate latex and to process the latex blend by the process of the invention.

IMPLEMENTATION OF THE INVENTION

The extruder used in the process pursuant to the invention in step a) contains either only one screw (single-screw extruder) or two parallel screws, both of which are operated in the same clockwise direction (co-rotating twin-screw extruder). A typical single-screw extruder for step a), for example, can be characterized by the following characteristic data: screw diameter D=34 mm, length =30 D.

For production purposes, for example, the extruder can have a screw diameter D of 50 mm to 250 mm and a screw length of 20 to 40 times the screw diameter (20–40 D).

It is preferred for the extruder screws used for energy dissipation from screw rotation to produce high shear gradients in the aqueous multiphased system. These can be achieved by transporting or circulating a product through narrow gaps. It is also advantageous for the extruder screw to be provided with kneading and shearing components over half the processing length. The kneading components can be either a kneading block or successively positioned individual kneading plates. Alternating left- and right-handed pitched plates can also be advantageous to increase the action.

The extruder can be operated, for example, in a temperature range of 150 to 300° C., preferably above 200° C., and especially at 240–260° C. Screw speeds up to 800 revolutions per minute (rpm) are possible without significant wear occurring; speeds of 200–300 rpm are preferred. A preferred combination is at least 240° C. and at least 200 rpm.

The coagulate is then transferred to a dewatering extruder, where process step b) is carried out. Extruders with appropriate dewatering zones, for example, are disclosed in U.S. Pat. No. 4,110,843, U.S. Pat. No. 4,148,991, or U.S. Pat. No. 5,232,649. However, it is preferred to use an extruder with counter-rotating screws according to EP-A 0 683 028, in which the melt is transported in partially filled screw grooves and is blocked into a cohesive melt cake in at least one of these screw grooves to form a locally narrowly limited steep pressure gradient. In this way, a phase separation of the liquid phase from the continuous melt phase (melt cake) is achieved. The water flows downward under the action of gravity and can be removed through suitable openings in the extruder cylinder.

For dewatering in process step b), the extruder can be operated, for example, in a temperature range of up to about 230° C., preferably 210° C. at the highest, especially not above 200° C., with a screw speed of 80 rpm, for example, and a pressure in the range of about 40 bar.

After removal of the water phase, the resin melt contains 5 to 20 wt. % water at the most, in the dissolved or liquid inclusion form. The water-soluble secondary components such as emulsifiers or electrolytes can be separated completely from the melt if pure water or other volatile solvent that dissolves the contaminants but not the resin is added to the dewatered melt in an additional mixing zone, and is separated in another dewatering zone in the same way as previously. In accordance with the invention, at least 94% of the aqueous phase can be separated in liquid form at the end of process step b).

The residual water and other volatile constituents are separated to a very great extent in process step c) by degassing. This can be done in a following degassing zone of the dewatering extruder or in a separate degassing extruder. Degassing usually occurs at normal pressure and/or at a pressure of 0.01 to 0.99 bar, or optionally in several steps with increasing vacuum. A water content below 0.1 wt. %, preferably 0.03 to 0.06 wt. %, is desired. After degassing, the melt can be brought to a melt pressure suitable for extrusion, in a following pumping zone and extruded.

The necessary level and uniformity of pressure can be maintained reliably during phase separation if the dewatering zone is physically separated from the degassing zone. The functions of phase separation and degassing in this case are divided between two extruders, with a "intermeshing" twin-screw extruder being needed for only the first function. The pressure at the end of the dewatering zone, which can be followed by a metering zone, can be adjusted by means of a throttle valve for the discharged melt.

The melt can be transferred through a pipe to an ordinary degassing extruder. If desired, a resin melt and optionally other additives such as lubricants, stabilizers, antistatis, colorants, UV absorbers, and the like can again be introduced there, after the degassing zone, in one or more mixing zones. The last volatile fractions can then be removed from the melt in another degassing zone.

At the end of the degassing extruder the melt is discharged in the form of a melt by a metering zone. This can be done using a die plate from which a number of thin strands are extruded, cooled to below the softening point, and cut into a commercial molding compound granulate. However, a formed resin profile such as a film can also be extruded directly with a suitable extrusion die in a known manner.

ADVANTAGEOUS EFFECTS OF THE INVENTION

The process pursuant to the invention offers a number of advantages. Thus, it makes possible effective coagulation in step a) without any coagulants, which as a rule is always desirable.

The separation of the coagulation and dewatering steps into two mechanical units leads to less wear on the machinery as such. Maintenance and down times are thereby reduced. The discharge of polymer together with the separated aqueous phase (residual polymer content of the wastewater) surprisingly is considerably less, even at high throughput rates.

Because the dewatering is better overall with the combined process, distinctly smaller residual emulsifier contents of the polymeric product are obtained. This is advantageous since emulsifier residues lead to moisture pickup, which causes undesirable milky-white cloudiness ("whitening"). The end product is thus of improved quality due to the overall lower residual emulsifier content.

EXAMPLES

Example 1 (comparison example)

An Emulsion Polymer Built Up in Three Steps with the Following Composition is Processed:
Step I:
Methyl methacrylate/ethyl acrylate/allyl methacrylate (Proportions: 95.7/4/0.3)
Step II:
Butyl acrylate/styrene/allyl methacrylate (82/17/1)
Step III: Methyl methacrylate/ethyl acrylate (96/4)
Weight ratio Step I:II:III=20/45/35
Weight ratio polymer phase/aqueous phase =45/55

The latex is pumped with a metering membrane pump at a mass flow rate of 10 kg/h into the extruder cylinder of a close-meshed counter-rotating twin-screw extruder. The screw diameters are 34 mm. The screws are triple-threaded with a pitch length of 30 mm. The coagulation zone in which the latex particles are converted into a melt cake has a length of 6 D and is kept at a temperature of 230° C. The dewatering zone and the discharge zone have an overall length of 20 D and are operated at a temperature of 210° C. The screw speed is set at 80 rpm.

In the area of the dewatering zone, the cylinder is opened with slits 2 mm wide and 60 mm long beneath which a collecting tank is attached pressure-tight to catch the outflowing aqueous phase. By blanketing the collecting tank with nitrogen, a pressure of 40 bar is set in the tank. 5.27 kg/h of water is drawn off from the collecting tank through a valve. The expressed water obtained contains 0.5 wt. % of organic substance (residual polymer). The melt largely free of aqueous phase still contains 8 wt. % of water, which is removed by means of vacuum degassing in a following degassing extruder to a residual moisture content of 0.06 wt. %. The product obtained was taken off as strands and cut to uniform-sized granulate in a granulator.

Example 2 (pursuant to the invention)

The system for dewatering latex pursuant to the invention consists of three parts: a conventional close-meshed co-rotating twin-screw extruder for coagulation of the polymer, a dewatering extruder for separating the aqueous phase from the melt phase, and a following degassing extruder. The coagulation extruder has a screw diameter of 34 mm and a processing length of 30 D. The double-threaded extruder screws have kneading blocks over a length of 14 D, for example such as 16 KB 5-2-30R4 pieces for energy dissipation. The counter-rotating twin-screw extruder described in Example 1 is used as the dewatering extruder. The degassing extruder used is identical with the unit used in Example 1.

10 kg/h of the latex described in Example 1 is pumped by a metering pump into the coagulation extruder. After coagulation of the latex at a screw speed of 250 rpm and at a cylinder temperature of 250° C., a residual polymer content of 0.35 wt. % was found in the expressed water after separating off the aqueous phase. The degassing extruder was run at a cylinder temperature of 190° C.

The residual water content after the dewatering step was 6 wt. %. The granulate chopped after drawing off and cooling the melt strands was brilliant and colorless.

Example 3 (comparison example)

An amount of latex increased to 15 kg/h was fed in by the process described in Example 1. The set screw speed was increased to 100 rpm to accomplish this. The temperatures at the pressing extruder were increased to 250° C. to achieve better coagulation. A temperature of 200° C. was set in the area of the dewatering zone.

After 12 min of operation, the outlet pipe of the water-collecting tank became plugged. The test had to be terminated since melt with too low a viscosity had flowed into the collecting tank.

Example 4 (comparison example)

An amount of latex increased to 20 kg/h was fed in by the process described in Example 1. The set screw speed was increased to 120 rpm to accomplish this. The residual polymer content obtained in the expressed water was found to be 2 wt. %. The amount of water remaining and to be degassed after dewatering was 11 wt. %. The product drawn off as strands, then cooled and cut in a granulator into uniform-sized granulate, is grayish because of metal wear from the close-meshed counter-rotating twin-screw extruder.

Example 5 (pursuant to the invention)

The throughput on the dewatering system operating according to the process of the invention was increased from 10 kg/h to 15 kg/h. The speed of the coagulation extruder was 250 rpm, and the speed of the dewatering extruder was 80 rpm. The residual polymer content obtained in the expressed water was found to be 0.35 wt. %. The amount of water remaining and to be degassed after the dewatering was 6 wt. %. The product drawn off as strands, then cooled and cut in a granulator into uniform-sized granulate, is brilliant and colorless and shows no gray cast as in Example 4.

Example 6 (pursuant to the invention)

The throughput on the pressing system operating according to the process of the invention was increased from 10 kg/h to 20 kg/h. The speed of the coagulation extruder was 250 rpm, the speed of the dewatering extruder was 60 rpm, and the cylinder temperature was 250° C. After separating the aqueous phase, a residual polymer content of 0.35 wt. % was found in the expressed water. The dewatering extruder was run at a cylinder temperature of 190° C.

The amount of water remaining and to be degassed after the dewatering was 6 wt. %. The product drawn off as strands, then cooled and cut in a granulator into uniform-sized granulate, is brilliant and shows no gray cast as in Example 4.

What is claimed is:

1. A process for dewatering a two-phase fluid mixture of a thermoplastic resin phase and a water phase by
   a) coagulating the two-phase fluid mixture in a first extruder which is a twin-screw extruder equipped with co-rotating screws,
   b) dewatering the coagulate in a twin-screw second extruder with counter-rotating screws and with a dewatering zone, and
   c) separating volatile constituents by degassing in a degassing extruder.

2. Process pursuant to claim 1, wherein a) is carried out at a melt temperature at least 30° C. higher than process step b).

3. The process of claim 2, wherein at least 94% of the water is separated in liquid form at the end of b).

4. Process pursuant to claim 1, characterized by the fact that at least 94 wt % of the water is separated in liquid form at the end of process b).

* * * * *